(12) United States Patent
Houlton

(10) Patent No.: US 9,836,877 B2
(45) Date of Patent: *Dec. 5, 2017

(54) HARDWARE ACCELERATED SIMULATION OF ATMOSPHERIC SCATTERING

(71) Applicant: Intel Corporation, Santa Clara, CA (US)

(72) Inventor: David Houlton, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,195

(22) Filed: Oct. 12, 2016

(65) Prior Publication Data

US 2017/0132832 A1    May 11, 2017

Related U.S. Application Data

(63) Continuation of application No. 12/720,983, filed on Mar. 10, 2010, now Pat. No. 9,495,797.

(51) Int. Cl.
*G06T 15/50* (2011.01)
*G06T 15/60* (2006.01)
*G06T 15/80* (2011.01)
*G06T 15/06* (2011.01)
*G06T 15/00* (2011.01)

(52) U.S. Cl.
CPC ............ *G06T 15/60* (2013.01); *G06T 15/005* (2013.01); *G06T 15/06* (2013.01); *G06T 15/80* (2013.01)

(58) Field of Classification Search
None
See application file for complete search history.

(56) References Cited

U.S. PATENT DOCUMENTS

| | | |
|---|---|---|
| 2006/0176303 A1 | 8/2006 | Fairclough |
| 2008/0231632 A1 | 9/2008 | Sulatycke |
| 2009/0006044 A1 | 1/2009 | Zhou et al. |
| 2009/0006046 A1 | 1/2009 | Zhou et al. |
| 2009/0006051 A1 | 1/2009 | Zhou et al. |
| 2010/0033482 A1 | 2/2010 | Zhou et al. |
| 2010/0085360 A1 | 4/2010 | Ren et al. |
| 2010/0302244 A1 | 12/2010 | Best |

FOREIGN PATENT DOCUMENTS

| | | |
|---|---|---|
| CN | 101458823 A | 6/2009 |
| CN | 101615300 A | 12/2009 |
| WO | 2011/057997 A2 | 5/2011 |

OTHER PUBLICATIONS

Biri et al., "Real Time Animation of Realistic Fog," Jun. 2002, 13th Eurographics Workshop on Rendering, 8 pages.

(Continued)

*Primary Examiner* — Andrew G Yang
(74) *Attorney, Agent, or Firm* — Jordan IP Law, LLC

(57) ABSTRACT

A method and system may include a hardware texture unit having logic to receive parameters of a view ray for a pixel of a graphical scene, and determine an illumination of the view ray. The illumination, which could indicate an inscatter illumination percentage for the view ray, may be passed to a software module such as a pixel shader for rendering of the pixel.

18 Claims, 1 Drawing Sheet

(56) References Cited

OTHER PUBLICATIONS

Nishita, Tomoyuki et al., "Display of the Earth Taking into Account Atmospheric Scattering," Proceedings of the 20th Annual Conference on Computer Graphics and Interactive Techniques, 1993, 8 pages.
Nielsen, M., "Course Notes for Simulating Fluids in CG Ray Marching", Apr. 7, 2009, 4 pages.
Combined Search and Examination Report for Great Britain Patent Application No. 1103414.7, dated Jun. 10, 2011, 8 pages.
Office Action for Great Britain Patent Application No. 1103414.7, dated Oct. 1, 2013, 3 pages.
Office Action for German Patent Application No. 102011013584.7, dated Jul. 27, 2012, 14 pages including 7 pages of English translation.
Dobashi, Y. et al., "Interactive Rendering of Atmospheric Scattering Effects Using Graphics Hardware", Graphics Hardware, 2002, 11 pages.
Chen et al., "Real-Time Rendering of Lights Shafts on GPU", In: Advances in Visual Computing, Second International Symposium, ISVC 2006, Lake Tahoe, NV, 2006, 11 pages.
Segal, M. et al., "Fast Shadows and Lighting Effects Using Texture Mapping," Computer Graphics. vol. 26, 1992, 4 pages.
Dobashi et al., "Interactive Rendering Method for Displaying Shafts of Light," Proceedings of the Eighth Pacific Conference on Computer Graphics and Applications, 2000, 8 pages.
Cabral et al., "Accelerated Volume Rendering and Tomographic Reconstruction Using Texture Mapping Hardware," Proceedings of the 1994 Symposium on Volume Visualization, ACM, New York, 1995, 9 pages.
Van Der Linden, Multiple Light Field Rendering, Proceedings of the First International Conference on Computer Graphics and Interactive Techniques in Autralasia and South East Asia, 2003, 7 pages. NPL.
Office Action for Chinese Patent Application No. 201110058191.3, dated Jan. 25, 2013, 14 pages including 8 pages of English translation.
Office Action for Chinese Patent Application No. 201110058191.3, dated Oct. 21, 2013, 13 pages including 7 pages of English translation.
Office Action for U.S. Appl. No. 12/720,983, dated Jan. 14, 2013, 14 pages.
Final Office Action for U.S. Appl. No. 12/720,983, dated Jul. 19, 2013, 14 pages.
Advisory Action for U.S. Appl. No. 12/720,983, dated Oct. 7, 2013, 8 pages.
Notice of Allowance for U.S. Appl. No. 12/720,983, dated Jul. 13, 2016 5 pages.

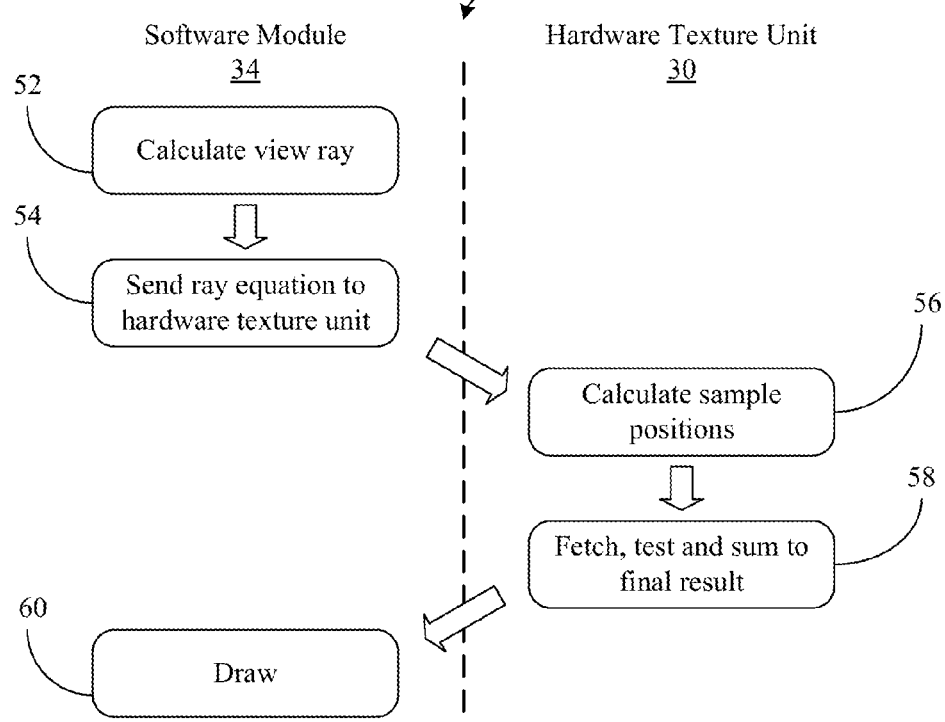
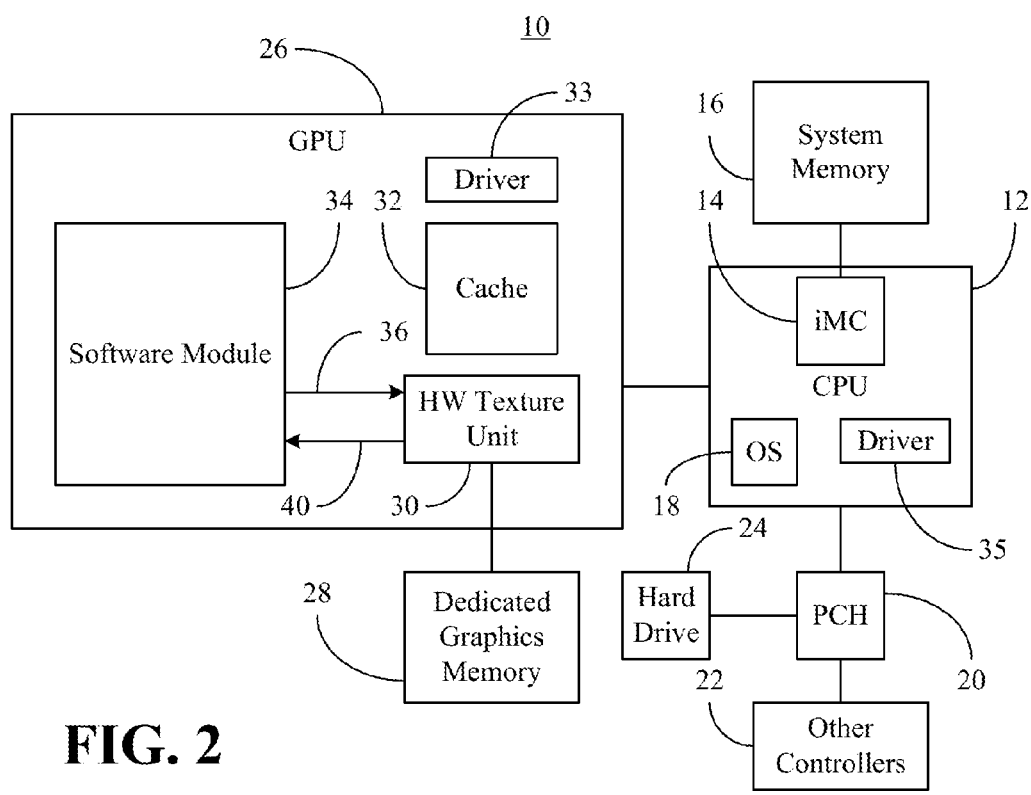

HARDWARE ACCELERATED SIMULATION OF ATMOSPHERIC SCATTERING

CROSS REFERENCED WITH RELATED APPLICATIONS

The present application claims the benefit of priority to U.S. patent application Ser. No. 12/720,983 filed on Mar. 10, 2010.

BACKGROUND

Atmospheric scattering can involve the interaction of light photons with materials in the atmosphere such as fog, clouds, suspended aerosols and other individual gas molecules. Thus, atmospheric scattering effects could be relevant to visually intensive computer graphics applications such as 3D (3-dimensional) computer games, flight simulators and other 3D imaging systems.

Conventional approaches to simulating atmospheric scattering might involve calculating view ray sample positions in one or more software threads executing on a graphics processor core and submitting each sample position as an individual shadow texture lookup request to a hardware texture unit. Because such an approach can result in high latencies and substantial reductions in performance, atmospheric scattering simulation has not been deployed to a significant extent in 3D computer graphics applications.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a flow diagram of an example of a method of simulating atmospheric scattering according to an embodiment; and FIG. 2 is a block diagram of an example of a system according to an embodiment.

DETAILED DESCRIPTION

Embodiments may provide for a computer readable storage medium including a set of stored instructions which, if executed by a processor, cause a computer to calculate a view ray for a pixel of a graphical scene and send parameters of the view ray to a hardware texture unit. The instructions can also cause a computer to receive a calculated illumination value for the view ray from the hardware texture unit.

Embodiments can also provide for a system including a hardware texture unit having logic to receive parameters of a view ray for a pixel of a graphical scene and determine an illumination value of the view ray.

In addition, embodiments may include a method of simulating atmospheric scattering in which a view ray is calculated for a pixel of a graphical scene, wherein the calculating is conducted by a software module. The method can also provide for sending parameters of the view ray to a hardware texture unit, which selects a plurality of sample locations along the view ray based on the parameters. The hardware texture unit may also compare the plurality of sample locations to a shadow texture to obtain a corresponding plurality of illumination values, and sum the plurality of illumination values to obtain an overall illumination value of the view ray. The method may also involve sending the overall illumination value to the software module.

A view ray can be treated a world-space vector extending from the viewer's eye position to a frame buffer pixel of a graphical scene. The length of the vector may therefore be proportional to the value in a corresponding depth buffer at that pixel. To estimate in-scattering along a view ray, the proportion of the ray that is illuminated by each light source in the scene may be determined. To make such a determination, the view ray can be transformed into a light's view space using a transformation matrix. The view ray may then be sampled at a plurality of sample positions along its length within the light frustum, accumulating illumination for each sample point where it is visible to the light (i.e., where it's depth value is less than that of the light's shadow texture map). Multiplying the number of "lit" samples with the sample spacing length can constitute a numerical integration approximating the total view distance over which the ray will accumulate illumination. A relatively large number of sample positions per view ray may be required to mitigate aliasing effects that can be inherent to point sampling techniques.

Turning now to FIG. 1, a process flow 50 is shown. The flow 50 may be generally used to simulate atmospheric scattering in real-time 3-dimensional (3D) computer graphics applications such as computer games, flight simulators and other 3D imaging systems. In the illustrated example, portions of the flow 50 take place in a software module 34 that might include a pixel shader software thread running on a graphics or general purpose processor, whereas other portions of the flow 50 are conducted on a fixed functionality hardware texture sampler/unit 30. Thus, the flow 50 may be implemented as a combination of executable instructions stored in a machine- or computer-readable medium such as random access memory (RAM), read only memory (ROM), programmable ROM (PROM), flash memory, etc., and fixed-functionality hardware using circuit technology such as application specific integrated circuit (ASIC), complementary metal oxide semiconductor (CMOS) or transistor-transistor logic (TTL) technology. For example, computer program code to carry out operations shown in the software module 34 may be written in any combination of one or more programming languages, including a shading language (which may even be pre-compiled or JITed/just-in-timed on the fly), an object oriented programming language such as C++ or the like and conventional procedural programming languages, such as the "C" programming language or similar programming languages. Moreover, the hardware texture unit 30 could be implemented as embedded logic using any of the aforementioned circuit technologies.

In particular, illustrated processing block 52 provides for using the software module 34 to calculate a view ray for a pixel of a graphical scene. The calculated equation/parameters for the view ray may include an initial position (x, y, z), a 3D set of gradients representing the change in position along each 3D axis per unit length (dx, dy, dz), a ray length (l), and a sample count (n). Block 54 provides for sending the parameters of the view ray to the hardware texture unit 30, which can select a plurality of sample locations along the view ray at block 56 based on the received parameters.

In particular, the texture unit 30 could project the view ray's 3D coordinates into a light's coordinate system to calculate the 2D (u, v) values corresponding to the ray's start and end points, an initial depth (t) from the light's point of view, and the gradients (dt, du, dv) of these values per sample step. At each sample location (i), the sample's ($u_i$, $v_i$) position within the light's 2D shadow map texture may be interpolated as (u+i*du, v+i*dv) and the sample's depth ($t_i$) as (t+i*dt) to obtain the plurality of sample locations.

Illustrated block 58 provides for comparing a sample's interpolated depth ($t_i$) against the depth value stored in the light's shadow map at position ($u_i$, $v_i$) to produce a sample's illumination value, and summing the plurality of illumination values to obtain an overall illumination of the view ray. For example, the texture unit 30 might fetch a portion/texel of a shadow texture based on the sample location interpolated 2D position in question, and conduct a test to determine if the sample location of the view ray is illuminated. The test could involve considering the sample illuminated if the interpolated depth is less than the depth value stored in the nearest shadow map texel (e.g., 0 if not illuminated and 1 if illuminated), or partially illuminated based on a plurality of nearby texels (e.g., 0, 0.25, 0.5, 0.75 or 1 for a 2×2 texel comparison). Each illumination value may be weighted based on its sample spacing, with the weighted plurality of illumination values being summed to obtain an illumination of the view ray. Thus, the calculated illumination, which can indicate the illumination percentage of the view ray, may be sent from the hardware texture unit 30 to the software module 34. Block 60 provides for using the software module 34 to render the pixel based on the illumination of the view ray. The process flow 50 may be repeated for each pixel of the graphical scene in question.

By using the hardware texture unit 30 to select of view ray sample locations, compare sample locations to the shadow texture, and sum illumination values, the illustrated flow 50 eliminates the time-consuming transfer of multiple individual texture samples from the hardware texture unit to the software module. As a result, the rendering of atmospheric scattering effects can be much more efficient and performance can be significantly enhanced. Simply put, the software module 34 can replace many individual texture lookups with a single texture unit call to retrieve the view ray's percent-illuminated value.

Turning now to FIG. 2, a computing system 10 is shown, wherein the system 10 may be part of a mobile platform such as a laptop, personal digital assistant (PDA), wireless smart phone, media player, imaging device, mobile Internet device (MID), etc., or any combination thereof. The system 10 may also be part of a fixed platform such as a personal computer (PC), server, workstation, etc. The illustrated system 10 includes a central processing unit (CPU) 12 with an integrated memory controller (iMC) 14 that provides access to system memory 16, which could include dual data rate (DDR) synchronous dynamic random access memory (SDRAM, e.g., DDR3 SDRAM JEDEC Standard JESD79-3C, April 2008) modules. The modules of the system memory 16 may be incorporated into a single inline memory module (SIMM), dual inline memory module (DIMM), small outline DIMM (SODIMM), and so on. The CPU 12 may also have one or more drivers 35 and/or processor cores (not shown), where each core may be fully functional with instruction fetch units, instruction decoders, level one (L1) cache, execution units, and so on. The CPU 12 could alternatively communicate with an off-chip variation of the iMC 14, also known as a Northbridge, via a front side bus or a point-to-point fabric that interconnects each of the components in the system 10. The CPU 12 may also execute an operating system (OS) 18 such as a Microsoft Windows, Linux, or Mac (Macintosh) OS.

The illustrated CPU 12 communicates with a platform controller hub (PCH) 20, also known as a Southbridge, via a hub bus. The iMC 14/CPU 12 and the PCH 20 are sometimes referred to as a chipset. The CPU 12 may also be operatively connected to a network (not shown) via a network port through the PCH 20 and various other controllers 22. Thus, the other controllers 22 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The other controllers 22 could also communicate with the PCH 20 to provide support for user interface devices such as a display, keypad, mouse, etc. in order to allow a user to interact with and perceive information from the system 10.

The PCH 20 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated PCH 20 is also coupled to storage, which may include a hard drive 24, read only memory (ROM), optical disk, flash memory (not shown), etc.

The illustrated system 10 also includes a graphics processing unit (GPU) 26 coupled to a dedicated graphics memory 28. The dedicated graphics memory 28 could include GDDR (graphics DDR) or DDR SDRAM modules, or any other memory technology suitable for supporting graphics rendering. The GPU 26 and graphics memory 28 might be installed on a graphics/video card, wherein the GPU 26 could communicate with the CPU 12 via a graphics bus such as a PCI Express Graphics (PEG, e.g., Peripheral Components Interconnect/PCI Express ×16 Graphics 150 W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 12 die, configured as a discrete card on the motherboard, etc.

The illustrated GPU 26 may execute a software module 34 (e.g., user space code) as part of a graphics application such as a 3D (3-dimensional) computer game, flight simulator, or other 3D imaging system, wherein the graphics application may often involve the real-time rendering of various graphical scenes. Thus, the software module 34 might include code for pixel shading and other tasks. The GPU 26 may also include one or more drivers 33, a cache 32, and rendering hardware such as a fixed functionality texture unit 30 that could include logic for vertex processing, texture application, rasterization, etc., to enhance and/or support graphics performance.

In particular, the software module 34 can simulate atmospheric scattering in a graphical scene by calculating view rays for pixel of the graphical scene and sending parameters 36 of the view rays to the hardware texture unit 30. As already noted, the texture unit 30 may have logic to select a plurality of sample locations along each view ray based on the parameters 36 and compare the sample locations to a shadow texture to obtain a corresponding plurality of sample locations. Portions of the shadow texture may be fetched from off-chip storage such as dedicated graphics memory 28, system memory 16 or even hard drive 24. The illustrated texture unit 30 also sums the plurality of illumination values to obtain illuminations 40 of the view rays, wherein the illuminations 40 indicate the illumination percentage for each view ray. The illuminations 40 can be returned to the software module 34 for final processing and rendering of the pixels.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
    calculating, via a software module implemented at least partly in one or more of configurable logic or fixed functionality logic hardware, a view ray for a pixel of a graphical scene including parameters of the view ray;
    selecting, via a hardware texture unit implemented at least partly in one or more of configurable logic or fixed functionality logic hardware, a plurality of sample locations along the view ray based on the parameters;
    comparing, via the hardware texture unit implemented at least partly in one or more of configurable logic or fixed functionality logic hardware, the plurality of sample locations to a shadow texture to obtain a corresponding plurality of illumination values;
    summing, via the hardware texture unit implemented at least partly in one or more of configurable logic or fixed functionality logic hardware, the plurality of illumination values to obtain an illumination of the view ray; and
    sending the illumination to the software module.

2. The method of claim 1, wherein the parameters of the view ray include a three-dimensional initial position, a three-dimensional set of gradients, a ray length, and a number of samples to be evaluated.

3. The method of claim 1, further including weighting the plurality of illumination values.

4. The method of claim 1, further including fetching portions of the shadow texture from a graphics memory based on the parameters of the view ray.

5. The method of claim 1, wherein the illumination indicates an illumination percentage for the view ray.

6. The method of claim 1, further including rendering the pixel based on the illumination of the view ray, wherein the rendering is conducted by the software module.

7. A system comprising:
a hardware texture unit having logic to:
determine an illumination of a view ray for a pixel of a graphical scene based on parameters of the view ray,
select a plurality of sample locations along the view ray based on the parameters,
compare the plurality of sample locations to a shadow texture to obtain a corresponding plurality of illumination values, and
sum the plurality of illumination values to obtain the illumination of the view ray.

8. The system of claim 7, wherein the parameters of the view ray are to include a three-dimensional initial position, a three-dimensional set of gradients, and a ray length.

9. The system of claim 8, wherein the parameters of the view ray are to further include a number of samples to be evaluated.

10. The system of claim 7, wherein the hardware texture unit further includes logic to weight the plurality of illumination values.

11. The system of claim 7, further including a graphics memory coupled to the hardware texture unit, the graphics memory to store the shadow texture and the hardware texture unit to include logic to fetch portions of the shadow texture from the graphics memory based on the parameters of the view ray.

12. The system of claim 7, wherein the hardware texture unit includes logic to receive the parameters of the view ray from a software module.

13. The system of claim 7, wherein the hardware texture unit includes logic to send the illumination of the view ray to a software module.

14. The system of claim 7, wherein the illumination is to indicate an illumination percentage for the view ray.

15. A non-transitory computer readable storage medium comprising a set of stored instructions which, if executed by a processor, cause a computer to:
calculate a view ray for a pixel of a graphical scene including parameters of the view ray;
send parameters of the view ray to a hardware texture unit; and
receive an illumination of the view ray from the hardware texture unit, wherein the illumination is based on the parameters, and wherein the parameters are to include a three-dimensional initial position, a three-dimensional set of gradients, and a ray length.

16. The medium of claim 15, wherein the parameters of the view ray are to further include a number of samples to be evaluated.

17. The medium of claim 15, wherein the instructions, if executed, further cause a computer to render the pixel based on the illumination of the view ray.

18. The medium of claim 15, wherein the illumination is to indicate an in-scatter illumination percentage for the view ray.

* * * * *